United States Patent
Chen

(10) Patent No.: US 8,109,651 B2
(45) Date of Patent: Feb. 7, 2012

(54) LIGHT PROJECTING APPARATUS OF SCANNER MODULE AND METHOD FOR ARRANGING LIGHT SOURCES THEREOF

(75) Inventor: San-Tang Chen, Taipei (TW)

(73) Assignee: Teco Image System Co., Ltd, Taipei (TW)

( * ) Notice: Subject to any disclaimer, the term of this patent is extended or adjusted under 35 U.S.C. 154(b) by 722 days.

(21) Appl. No.: 12/244,733

(22) Filed: Oct. 2, 2008

(65) Prior Publication Data
US 2009/0310344 A1    Dec. 17, 2009

(30) Foreign Application Priority Data
Jun. 13, 2008 (TW) .............................. 97122250 A

(51) Int. Cl.
*F21V 33/00* (2006.01)
(52) U.S. Cl. .............. 362/249.02; 362/612; 362/613
(58) Field of Classification Search ........... 362/612, 362/613, 249.02
See application file for complete search history.

(56) References Cited

U.S. PATENT DOCUMENTS 7,453,419 B2 * 11/2008 Yee et al. .................. 345/39
2006/0061539 A1 * 3/2006 Song et al. ................ 345/102

* cited by examiner

*Primary Examiner* — Laura Tso
(74) *Attorney, Agent, or Firm* — Rabin & Berdo, P.C.

(57) ABSTRACT

A light projecting apparatus of a scanner module and a method for arranging the light sources thereof are provided. The light projecting module includes a substrate with a first end, a second end and a middle section. The first end and the second end are respectively positioned at both sides of the middle section. The light projecting module also includes multiple light emitting diodes (LEDs) positioned on the substrate. An arrangement spacing interval is formed between every two adjacent light emitting diodes; the arrangement spacing intervals are respectively decreased gradually from the middle section toward both the first end and the second end.

20 Claims, 7 Drawing Sheets ced tube A2 to the document A5 through a light reflecting sheet A6. The result is that the light sensing element receives light unevenly, causing the light received to be brighter at a middle part and dimmer at the parts of two sides, influencing the scanning quality after reflectors A4 reflect light to CCD A1, because the brilliance of the fluorescent tube A2 at the middle part thereof is much higher than the brilliance at the two ends thereof, or it is limited by a characteristic of an optical lens.

LIGHT PROJECTING APPARATUS OF SCANNER MODULE AND METHOD FOR ARRANGING LIGHT SOURCES THEREOF

CROSS-REFERENCES TO RELATED APPLICATIONS

This non-provisional application claims priority under 35 U.S.C. §119(a) on Patent Application No(s). 97122250 filed in Taiwan, R.O.C. on 2008 Jun. 13, the entire contents of which are hereby incorporated by reference.

FIELD OF THE INVENTION

The present invention relates to a light projecting apparatus and a method for arranging light sources thereof, and more particularly to a light projecting apparatus of a scanner module and a method for arranging light sources thereof.

BACKGROUND

Accompanying the progress of technology, optical scanners have already become a popular computer peripheral device. An image capturing method for an optical scanner mainly uses a light emitting device to project light onto a document. The light is guided to a light sensing element through a lens set after being reflected by the document, and the light sensing element can check and measure light with different strength reflected from different areas on the document. The reflected light wave is then converted to digital data. Thereafter, scanning software is used to read the data and reassemble it into a computer image file.

Please refer to FIGS. 1 and 2. An ideal light emitting device should have a uniform brightness distribution, but the current scanner modules mostly use a charge coupled device (CCD) as a light sensing element A1 and a fluorescent tube A2 as a light emitting device so as to utilize the fluorescent tube A2 to illuminate and scan a document A5 placed on a platform A3, and reflect light emitted from the fluorescent tube A2 to the document A5 through a light reflecting sheet A6. The result is that the light sensing element receives light unevenly, causing the light received to be brighter at a middle part and dimmer at the parts of two sides, influencing the scanning quality after reflectors A4 reflect light to CCD A1, because the brilliance of the fluorescent tube A2 at the middle part thereof is much higher than the brilliance at the two ends thereof, or it is limited by a characteristic of an optical lens.

Due to the increase in environmental awareness, a fluorescent tube such as external electrode fluorescent (EEFL) or cold cathode fluorescent (CCFL) used in the scanner module is gradually being replaced by other light sources, because it contains mercury or other harmful substances; a light emitting diode (LED) is currently one of the best substitutes. Accompanying the popularity of LEDs, a LED light strip structure replacing the fluorescent tube has emerged; it is formed as a light source device similar to a fluorescent tube by connecting LED pellets to one another in series in an equidistant arrangement on a long-strip type substrate. However, the illumination brightness of the entire body has the same characteristic problem as the fluorescent tube, namely, there is a significant drop between the brightness of a middle part thereof and the brightness of the two ends thereof. To solve this problem, the brightness of the two ends can always be increased by means of firmware (F/W) compensation at the end of the process, to allow the brightness to be as uniform as possible to achieve improved image brightness.

However, the manner mentioned above is unable to improve a signal/noise ratio (S/N ratio); the noise is also amplified after the brightness of the two ends is increased by means of the firmware (F/W), causing an image to be distorted.

SUMMARY OF THE INVENTION

In an embodiment, a light projecting structure of a scanner module includes a light sensing element for receiving light uniformly.

In another embodiment, a light projecting apparatus of a scanner module is provided. The light projecting apparatus includes a substrate and multiple light emitting diodes (LEDs). The substrate includes a first end, a second end and a middle section. The first end and the second end are respectively positioned at two sides of the middle section. The light emitting diodes (LEDs) are positioned on the substrate; each of multiple arrangement spacing intervals is respectively formed between two adjacent ones of the light emitting diodes. The arrangement spacing intervals are respectively decreased gradually toward the first end and the second end from the middle section.

In another embodiment, a method for arranging light sources of a scanner module is provided, The method first provides a substrate, and then disposes multiple light emitting diodes on the substrate in sequence according to a preset spacing interval. Next, the method calculates the average brightness of each preset spacing interval, and then obtains multiple arrangement spacing intervals corresponding to the preset spacing intervals; wherein a value of each arrangement spacing interval is directly proportional to a percentage of the average brightness of the corresponding preset spacing interval divided by an entire brightness. Afterwards, the method rearranges the light emitting diodes on the substrate in accordance with the arrangement spacing intervals.

In another embodiment, the first end, the second, and the middle section of the substrate may be positioned on the same horizontal plane or different horizontal planes.

In another embodiment, a variation of the arrangement spacing interval from the middle section toward the first end may be different from a variation of the arrangement spacing interval from the middle section toward the second; or, the variation of the arrangement spacing interval from the middle section toward the first end may be the same as the variation of the arrangement spacing interval from the middle section toward the second end.

In another embodiment, the value of the arrangement spacing interval is inversely proportional to the Nth power of the average brightness of the arrangement spacing interval (where N is larger than 0, and may be an integer or a decimal); this is used for adjusting the brightness of the middle section. For example, the value of the arrangement spacing interval may be inversely proportional to the square or third power of the average brightness of the arrangement spacing interval. Furthermore, in another embodiment, the brightness of the middle section is substantially 80% of the brightness of either the first end or the second end.

The present disclosure with the various embodiments arranges the light emitting diodes by means of continuous unequal spacing intervals, thereby enabling optimal brightness uniformity. The image distortion caused from the firmware (F/M) process at the posterior end can be decreased substantially and the image scanning quality can be further increased after the image brightness has been made more uniform by means of the process of an imaging system (i.e. the S/N ratio at each one of the two ends is increased).

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 2:
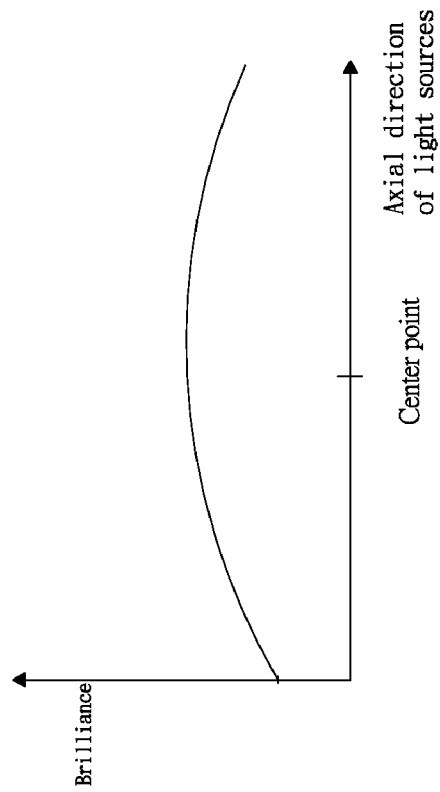
FIG. 2 is a diagram of a brightness curve of a conventional scanner.
Figure 1:
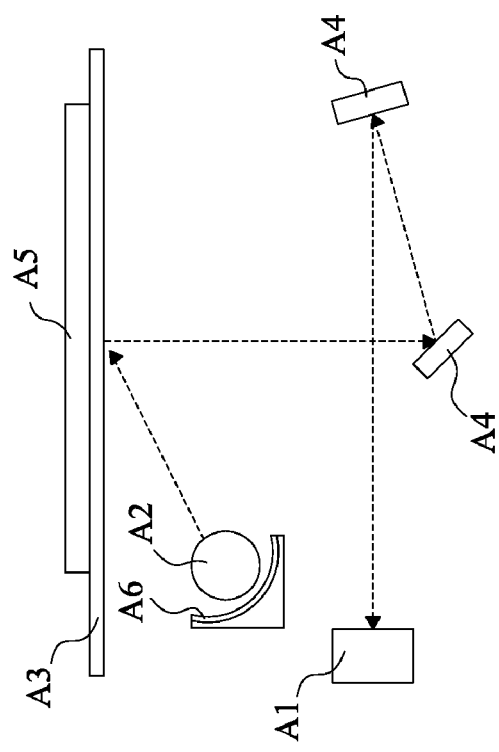
FIG. 1 is a schematic view of a conventional scanner module structure.
Figure 3:
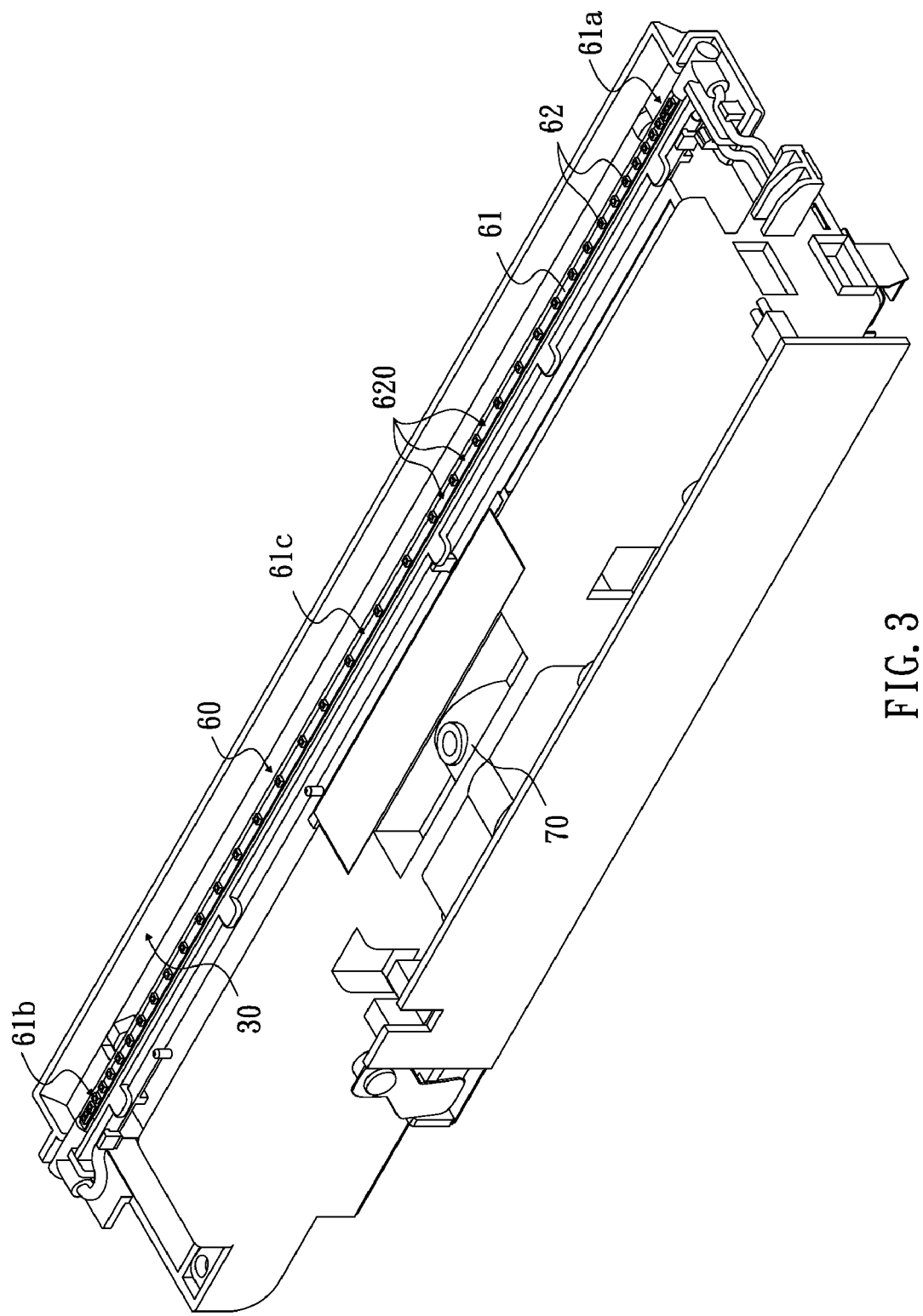
FIG. 3 is a perspective view of a light projecting apparatus according to an embodiment of the present invention.
Figure 4:
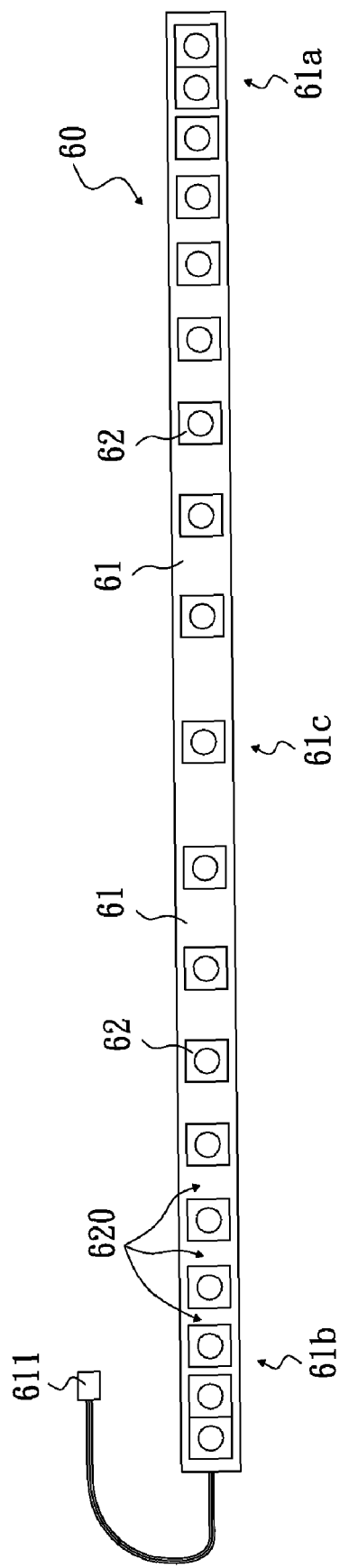
FIG. 4 is a plane view of a light projecting apparatus according to another embodiment of the present invention.
Figure 5:
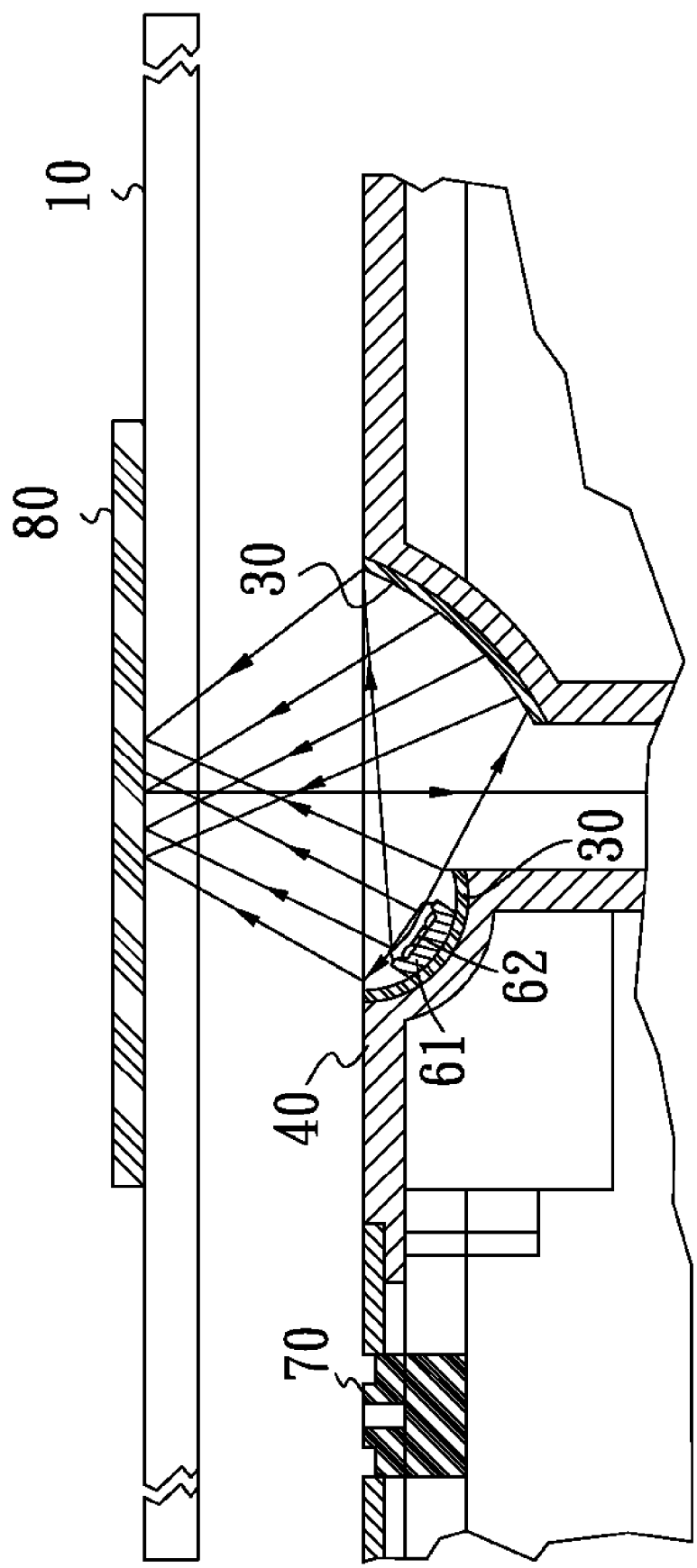
FIG. 5 is a schematic view of a structure of a light projecting apparatus applied in a scanner module according to another embodiment of the present invention.
Figure 6A:
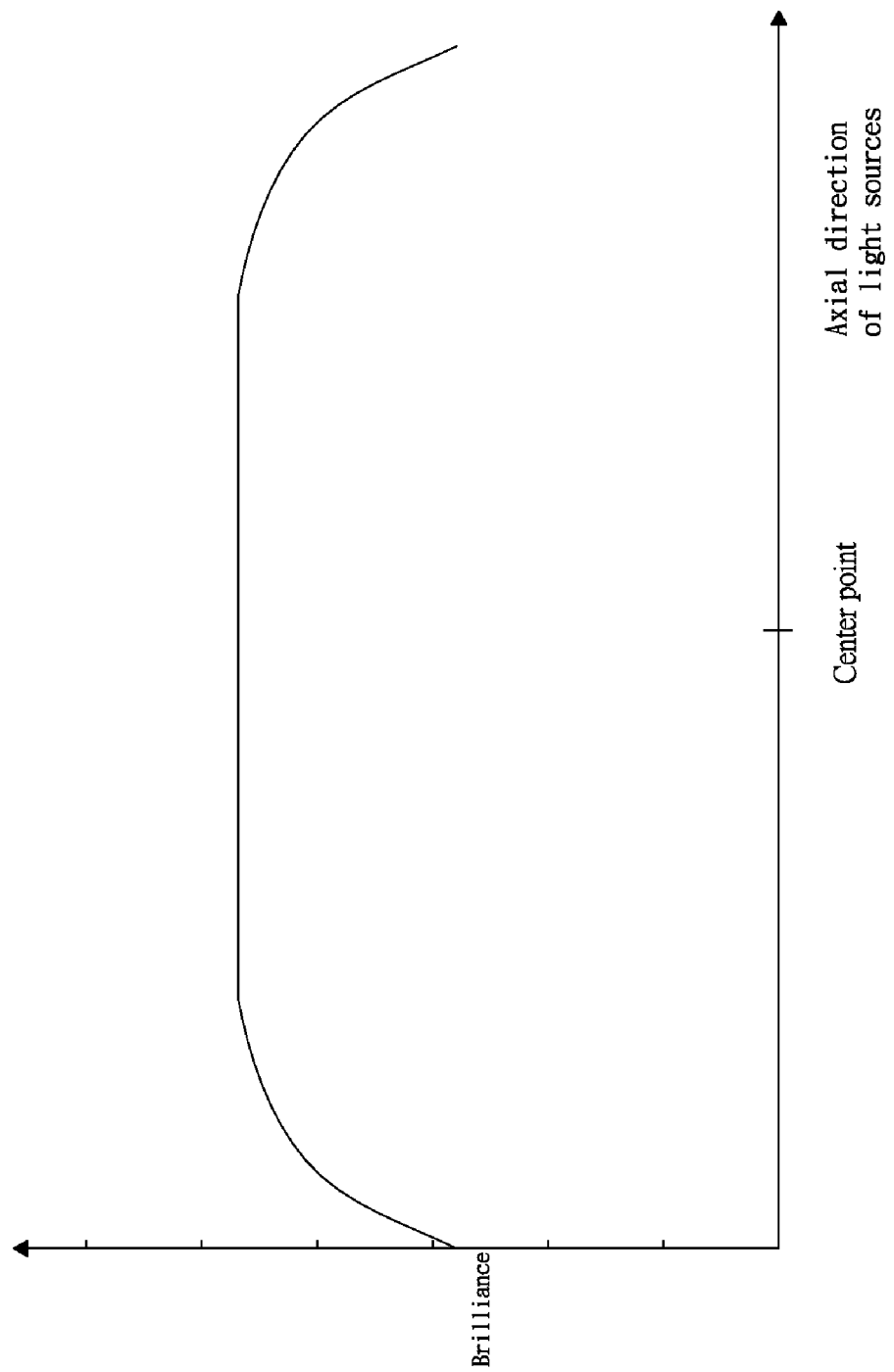
FIG. 6A is a diagram of a brightness curve for a general light projecting apparatus according to another embodiment of the present invention.
Figure 6B:
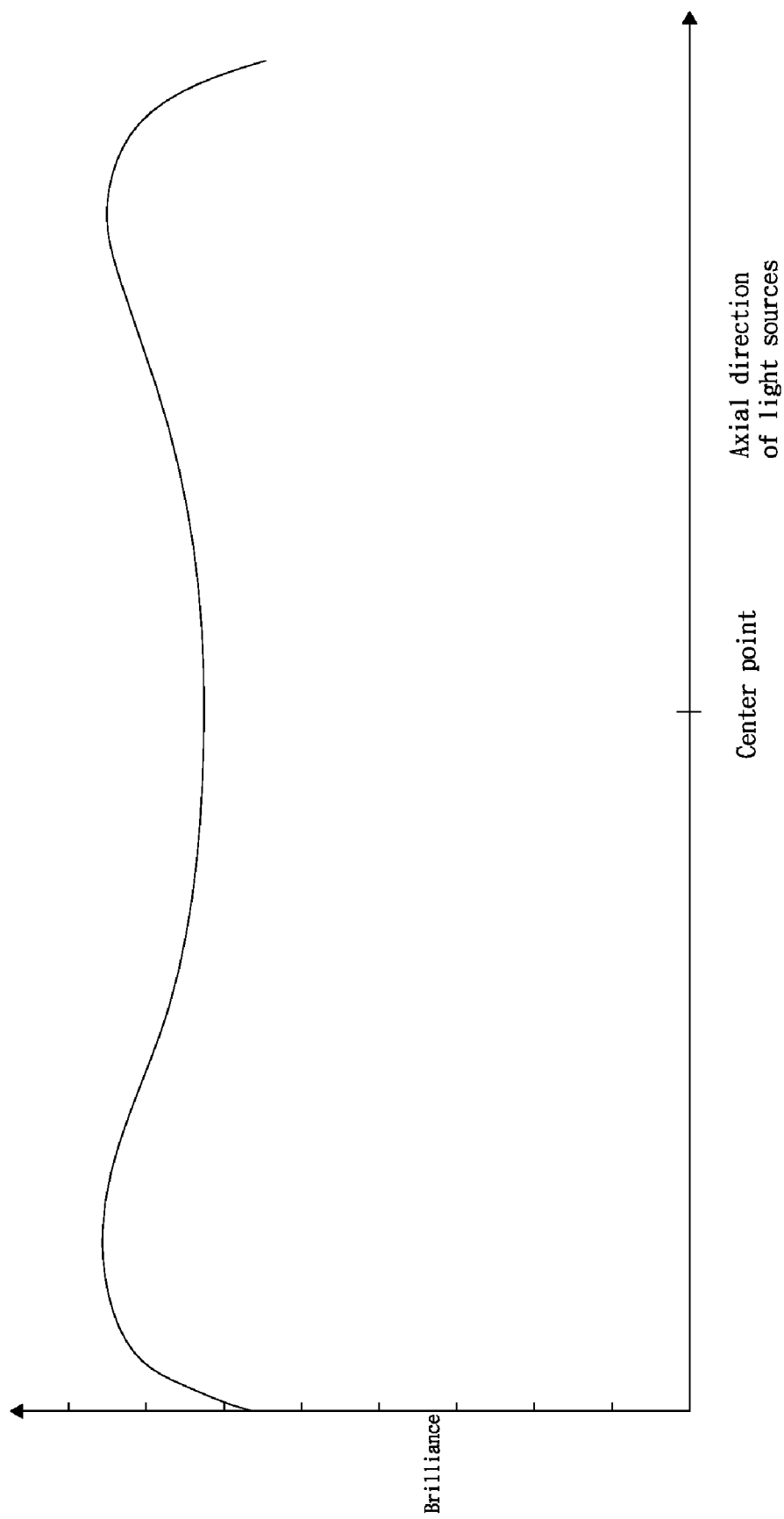
FIG. 6B is a diagram of a brightness curve for a LED light projecting apparatus according to another embodiment of the present invention.

Please refer to FIGS. 3, 4, 5, 6A and 6B. FIG. 3 is a perspective view, showing a light projecting apparatus according to a first embodiment. FIG. 4 is a plane view, showing a light projecting apparatus according to another embodiment. FIG. 5 is a schematic view, showing a structure of a light projecting apparatus applied in a scanner module according to another embodiment. FIG. 6A is a diagram, showing a brightness curve of a general light projecting apparatus according to another embodiment. FIG. 6B is a diagram of a brightness curve, showing an LED light projecting apparatus according to another embodiment.

A light projecting apparatus 60 of a scanner module includes a substrate 61 and multiple light emitting diodes (LEDs) 62.

The substrate 61 has approximately a long strip shape, and includes a first end 61a, a second end 61b and a middle section 61c. The first end 61a and the second end 61b are respectively positioned at two sides of the middle section 61c, in which the first end 61a, the second end 61b and the middle section 61c are preferably positioned at the same horizontal plane; although such example should not be taken to limit the present disclosure. In another embodiment, the first end 61a, the second end 61b and the middle section 61c of the substrate 61 may also be positioned at different horizontal planes.

The LEDs 62 are positioned on the substrate 61 and arranged in sequence. An arrangement spacing interval 620 is formed between every two adjacent LEDs 62. The arrangement spacing interval 620 is decreased gradually from the middle section 61c toward the first end 61a and the second end 61b respectively. Here, a variation of the arrangement spacing interval 620 from the middle section 61c toward the first end 61a may be the same as a variation of the arrangement spacing interval 620 from the middle section 61c toward the second end 61b; but such examples should not be taken to limit the present disclosure. In another embodiment, the variation of the arrangement spacing interval 620 from the middle section 61c toward the first end 61a may also be different from the variation of the arrangement spacing interval 620 from the middle section 61c toward the second end 61b. Furthermore, in some embodiments, the LED 62 may preferably be a white LED, and the LEDs 62 may have different brightness; but such examples should not be taken to limit the present disclosure.

In an embodiment, the value of the arrangement spacing interval 620 mentioned above is inversely proportional to the Nth power of an average brightness of the arrangement spacing interval 620. In an embodiment, the value of the arrangement spacing interval 620 may be inversely proportional to the square of the average brightness of the arrangement spacing interval 620. In another embodiment, the value of the arrangement spacing interval 620 may be inversely proportional to the third power of the average brightness of the arrangement spacing interval 620. Here the square power and third power are only taken as examples, and should not be taken as limitations to the present disclosure.

Furthermore, a power module 611 is installed on one side of the substrate 61. Power module 611 is connected to an external power to provide the LEDs 62 with necessary power for emitting light.

The brightness of each of the LEDs 62 is measured first when the LEDs 62 are arranged on the substrate 61. Afterwards, the real brightness of the LEDs 62 arranged as a light strip structure by distancing every two LEDs 62 with a preset spacing interval (i.e. by means of equidistance) are able to be calculated and estimated when. Namely, sum up those single light emitting curves of all the LEDs 62 (in different positions) to obtain an entire light emitting strength curve of the light strip structure, and then calculate the average brightness of each preset spacing interval (i.e. to obtain the average brightness capable of representing this preset spacing interval). The brightness would be lower if the spacing interval between the two LEDs 62 becomes larger. Assuming that the value of each arrangement spacing interval 620 is directly proportional to a percentage of the average brightness of a corresponding preset spacing interval divided by the entire brightness, the value of each arrangement spacing interval 620 can then be obtained as follows.

mth arrangement spacing interval $L_m = (a_m)/(a_1 + a_2 + a_3 + \ldots + a(n-1) + a_n)$ in which n=the number of the LEDs $a_m$=the average brightness of mth preset spacing interval m=1, 2, ..., (n−1)

The LEDs 62 can then be arranged according to the unequal arrangement spacing intervals 620 after each of the arrangement spacing intervals 620 is calculated, so as to ensure that uniformity of brightness is optimized (the corresponding brilliance curve is shown in FIG. 6A).

As an example, the average brightness may be the brightness at a middle position of the preset spacing interval or the arrangement spacing interval 620; but such example should not be taken as a limitation to the present disclosure.

As shown in FIGS. 4 and 5, the light projecting apparatus 60 projects scanning light toward a document 80 placed on a scanning platform 10 and the scanning light is reflected by reflectors 30. Since the LEDs 62 are arranged on the light projecting apparatus with the unequal arrangement spacing intervals 62, the intensities of the scanning light projected by the first end 61a, the second end 61b and the middle section 61c would be the same. The document 80 therefore receives the light uniformly. Image distortion caused from the firmware (F/M) process at the posterior end can be substantially decreased, and the image scanning quality can be increased further after the brightness of an image processed by an imaging system becomes more uniform.

In addition, the imaging characteristic of a lens of the light sensing element 70 also causes the middle brightness of the scanned image to be higher than the peripheral brightness thereof (the brightness of an imaging center is 20% higher than an imaging peripheral). Therefore, in another embodiment, the LEDs 62 may further be arranged with unequal spacing intervals 620 to cause the brightness of the middle section 61c to be only 80% of the brightness at either the first end 61a or the second end 61b. The brightness curve at the middle section 61c would be lowered by approximately 20% (the corresponding brilliance curve is shown in FIG. 6B) and the brightness of a scanned image would be genuinely uniform.

Figure 7:
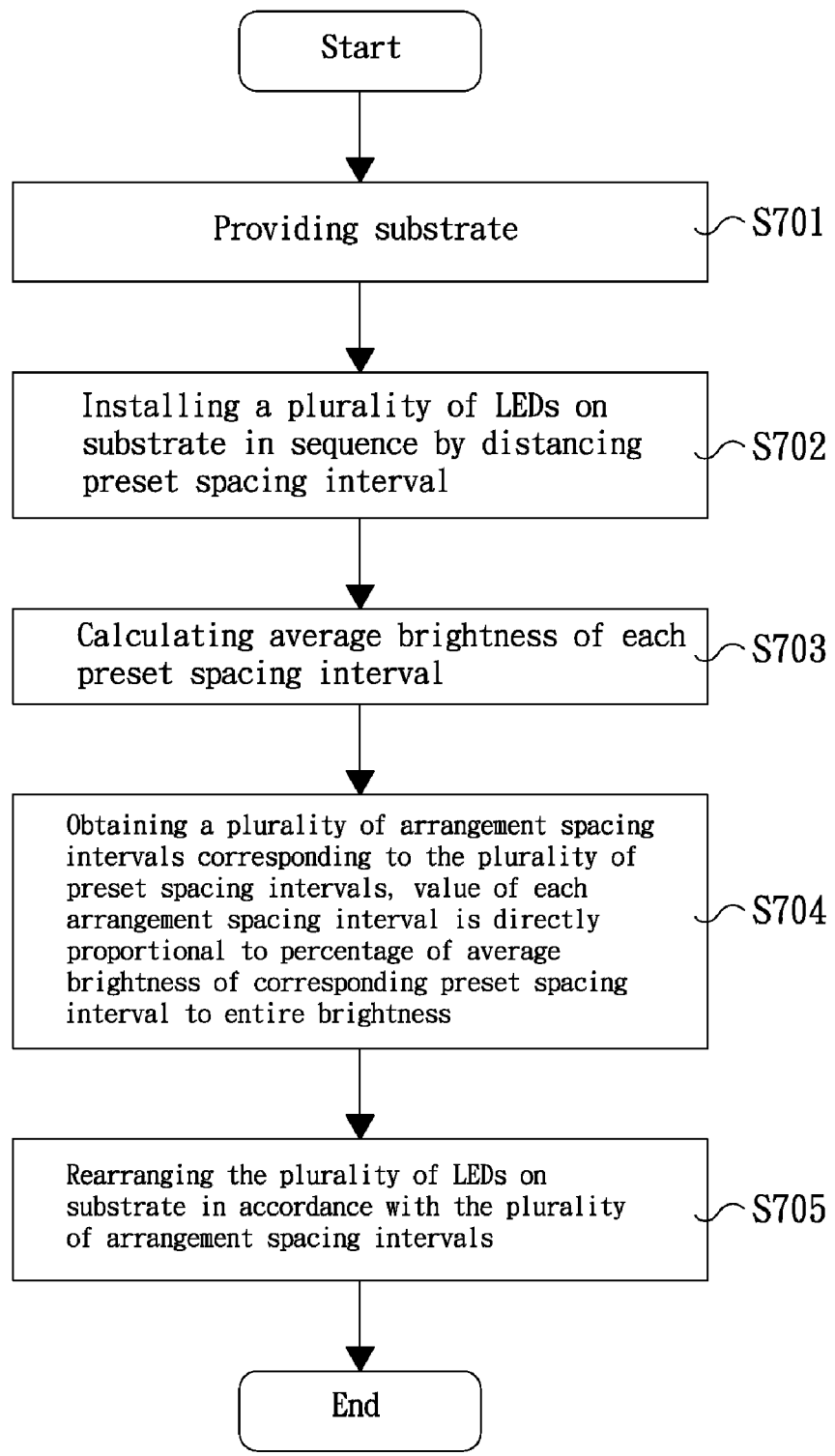
FIG. 7 is a flow chart of a method of arranging light sources on a substrate according to another embodiment.

Please refer to FIG. 7. The present embodiment discloses a method for arranging light sources of a scanner module. The method includes the follow steps.

Step 701: providing a substrate 61.

In this step, the substrate 61 has approximately a long strip shape, and includes a middle section 61c, a first end 61a and a second end 61b at two sides of middle section 61c; wherein the first end 61a, the second end 61b and the middle section 61c of the substrate 61 may preferably be positioned on the same horizontal plane and may also be positioned on different horizontal planes.

Step 702: installing multiple light emitting diodes (LEDs) 62 on the substrate 61 in sequence by distancing every two LEDs 62 with a preset spacing interval.

The brightness of the single LED 62 is first measured when the LEDs 62 are arranged on the substrate 61, and the LEDs 62 are arranged on the substrate 61 to form a light strip structure by distancing every two LEDs 62 with the preset spacing interval.

Step 703: calculating average brightness of each preset spacing interval.

Real brightness is first estimated when the LEDs 62 are arranged to string up the light strip structure by distancing every two LEDs 62 with the preset spacing interval. Namely the illumination curves of the all LEDs 62 (on different positions) are added together to obtain an entire illumination strength curve of the light strip structure, and the average brightness of each preset spacing interval is obtained afterwards; where the average brightness may be the brightness at a middle position of the preset spacing interval or an arrangement spacing interval 620; although such example should not be taken as a limitation to the present disclosure.

Step 704: obtaining the arrangement spacing intervals 620 corresponding to the preset spacing intervals, the value of each arrangement spacing interval 620 being directly proportional to the percentage of the average brightness of the corresponding preset spacing interval to the entire brightness.

The value of each arrangement spacing interval 620 is directly proportional to a percentage of the average brightness of a corresponding preset spacing interval divided by the entire brightness. The value of each spacing interval 620 can then be obtained as follows:

mth arrangement spacing interval $L_m = (a_m)/(a_1+a_2+a_3+ \ldots +a_{(n-1)}+a_n)$ where n=the number of the LEDs $a_m$=the average brightness of mth preset spacing interval m=1, 2, ..., (n−1)

Step 705: rearranging the LEDs 62 on the substrate 61 according to the arrangement spacing intervals 620.

The LEDs 62 can then be arranged according to the unequal arrangement spacing intervals 620 after the value of each arrangement spacing interval 620 is obtained so as to ensure uniformity of brightness is optimized (the brilliance thereof is show in FIG. 6A). Because the imaging characteristic of a lens of the light sensing element 70 will also cause the middle brightness of the scanned image to be higher than the peripheral brightness thereof (the brightness of an imaging center is 20% higher than an imaging peripheral), the method assumes that the value of each arrangement spacing interval 620 is directly proportional to the Nth power of the percentage of the average brightness of the corresponding preset spacing interval to the entire brightness (N is larger than 1, and may be an integer or decimal) in Step 704. The brightness curve can therefore has the brightness of the middle section lower than the other two ends. The middle brightness of the curve is designed to be approximately 20% lower than the other end in order to solve the imaging characteristic problem of a lens (the brightness of an imaging center is 20% higher than an imaging peripheral). According to this demand, the method further assumes that a middle section curve is a parabola (the two ends of the parabola are respectively the highest brightness point of a left section and the highest brightness point of a right section, and the lowest brightness at the center of the parabola is set to be 80% of the highest brightness at the either end). The value of each arrangement spacing interval 620 at the middle section can then be obtained in sequence according to the following manner, after an equation of the parabola is obtained (here, assume that the value of each arrangement spacing interval 620 is directly proportional to the square of the percentage of the average brightness of the corresponding preset spacing interval to an entire brightness). The value is:

mth (counting from the highest point of the left end) arrangement spacing interval $L_m = D*[(1/a_m)^2]/[(1/a_1)^2 + (1/a_2)^2 + (1/a_3)^2 + \ldots + (1/a_{(n-1)})^2 + (1/a_n)^2]$ in which D=the length from the highest brightness point of the first end to the highest brightness point of the second end;

n=the number of LEDs in the range of D;

m=(n−1)

After the value of each arrangement spacing interval 620 is obtained, the LEDs 62 can then be arranged according to the unequal arrangement spacing intervals 620. to ensure the brightness of the middle section 61c is substantially 80% of the brightness of either the first end 61a or the second end 61b, and thereby ensuring a part of the brightness curve at the middle section 61c is approximately 20% less the brilliance thereof is shown in FIG. 6B) Thus, the brightness of a scanned image becomes genuinely uniform.

In addition, the D mentioned above is the length from the highest brightness point at the first end to the highest brightness point at the second end; although such example should not be taken as a limitation to the present disclosure. In another embodiment, D may also be a length from any chosen point in a section of the first end 61a with gradually decreasing brightness to any chosen point in a section of the second end 61b with gradually increasing brightness.

According to the embodiments disclosed above, a light projecting apparatus of a scanner module arranges multiple LEDs by means of continuous unequal spacing intervals. The LEDS are disposed on a first end and a second end of a substrate with higher concentration and disposed on a middle section with looser disposition so as to ensure optimal uniformity of brightness. The image distortion caused from a firmware (F/W) process at a posterior end can be decreased substantially after the image brightness becomes more uniform through an imaging system (namely, a signal/noise (S/N) ratio of the either end is raised), and the image scanning quality can be increased further.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light projecting apparatus of a scanner module, comprising:
a substrate, comprising a first end, a second end and a middle section, the first end and the second end being respectively positioned at either side of the middle section; and
a plurality of light emitting diodes, positioned on the substrate, an arrangement spacing interval being formed between the two adjacent light emitting diodes, the arrangement spacing interval being respectively decreased gradually from the middle section toward the first end and the second end, and a value of the arrangement spacing interval being inversely proportional to the Nth power of an average brightness of the arrangement spacing interval.

2. The light projecting apparatus of a scanner module according to claim 1, wherein the first end, the second end and the middle section of the substrate are positioned on the same horizontal plane.

3. The light projecting apparatus of a scanner module according to claim 1, wherein the first end, the second end and the middle section of the substrate are positioned on different horizontal planes.

4. The light projecting apparatus of a scanner module according to claim 1, wherein the plurality of light emitting diodes are white light emitting diodes.

5. The light projecting apparatus of a scanner module according to claim 1, wherein the plurality of light emitting diodes are lighting emitting diodes with different brightness.

6. The light projecting apparatus of a scanner module according to claim 1, wherein the variation of the arrangement spacing interval from the middle section toward the first end is different from the variation of the arrangement spacing interval from the middle section toward the second end.

7. The light projecting apparatus of a scanner module according to claim 1, wherein the variation of the arrangement spacing interval from the middle section toward the first end is the same as the variation of the arrangement spacing interval from the middle section toward the second end.

8. The light projecting apparatus of a scanner module according to claim 1, wherein the value of the arrangement spacing interval is inversely proportional to the square of the average brightness of the arrangement spacing interval.

9. The light projecting apparatus of a scanner module according to claim 1, wherein the value of the arrangement spacing interval is inversely proportional to the third power of the average brightness of the arrangement spacing interval.

10. A method for arranging light sources of a scanner module, comprising the follow steps:
providing a substrate;
installing a plurality of light emitting diodes on the substrate in sequence by placing them according to a preset spacing interval;
calculating an average brightness of each preset spacing interval;
obtaining a plurality of arrangement spacing intervals corresponding to the plurality of preset spacing interval, a value of each arrangement spacing interval being directly proportional to a percentage of the average brightness of the corresponding preset spacing interval to an entire brightness; and
rearranging the plurality of light emitting diodes on the substrate in accordance with the arrangement spacing intervals.

11. The method for arranging light sources of a scanner module according to claim 10, wherein the substrate comprises a first end, a second end and a middle section, and the first end and the second end are respectively positioned at two sides of the middle section.

12. The method for arranging light sources of a scanner module according to claim 11, wherein the arrangement spacing interval is gradually decreased from the middle section toward the first end and the second end respectively.

13. The method for arranging light sources of a scanner module according to claim 11, wherein the first end, the second end and the middle section of the substrate are positioned on the same horizontal plane.

14. The method for arranging light sources of a scanner module according to claim 11, wherein the first end, the second end and the middle section of the substrate are positioned on different horizontal planes.

15. The method for arranging light sources of a scanner module according to claim 10, wherein the plurality of light emitting diodes are white light emitting diodes.

16. The method for arranging light sources of a scanner module according to claim 10, wherein the plurality of light emitting diodes are lighting emitting diodes with different brightness.

17. The method for arranging light sources of a scanner module according to claim 10, wherein a value of the arrangement spacing interval is inversely proportional to the Nth power of an average brightness of the arrangement spacing interval.

18. The method for arranging light sources of a scanner module according to claim 17, wherein the value of the arrangement spacing interval is inversely proportional to the square of the average brightness of the arrangement spacing interval.

19. The method for arranging light sources of a scanner module according to claim 17, wherein the value of the arrangement spacing interval is inversely proportional to the third power of the average brightness of the arrangement spacing interval.

20. A light projecting apparatus of a scanner module, comprising:
a substrate, comprising a first end, a second end and a middle section, the first end and the second end being respectively positioned at two side of the middle section; and
a plurality of light emitting diodes, positioned on the substrate, an arrangement spacing interval being formed between the two adjacent light emitting diodes, the arrangement spacing interval being respectively decreased gradually from the middle section toward the first end and the second end, and the variation of the arrangement spacing interval from the middle section toward the first end being different from the variation of the arrangement spacing interval from the middle section toward the second end.

* * * * *